Figure 1:
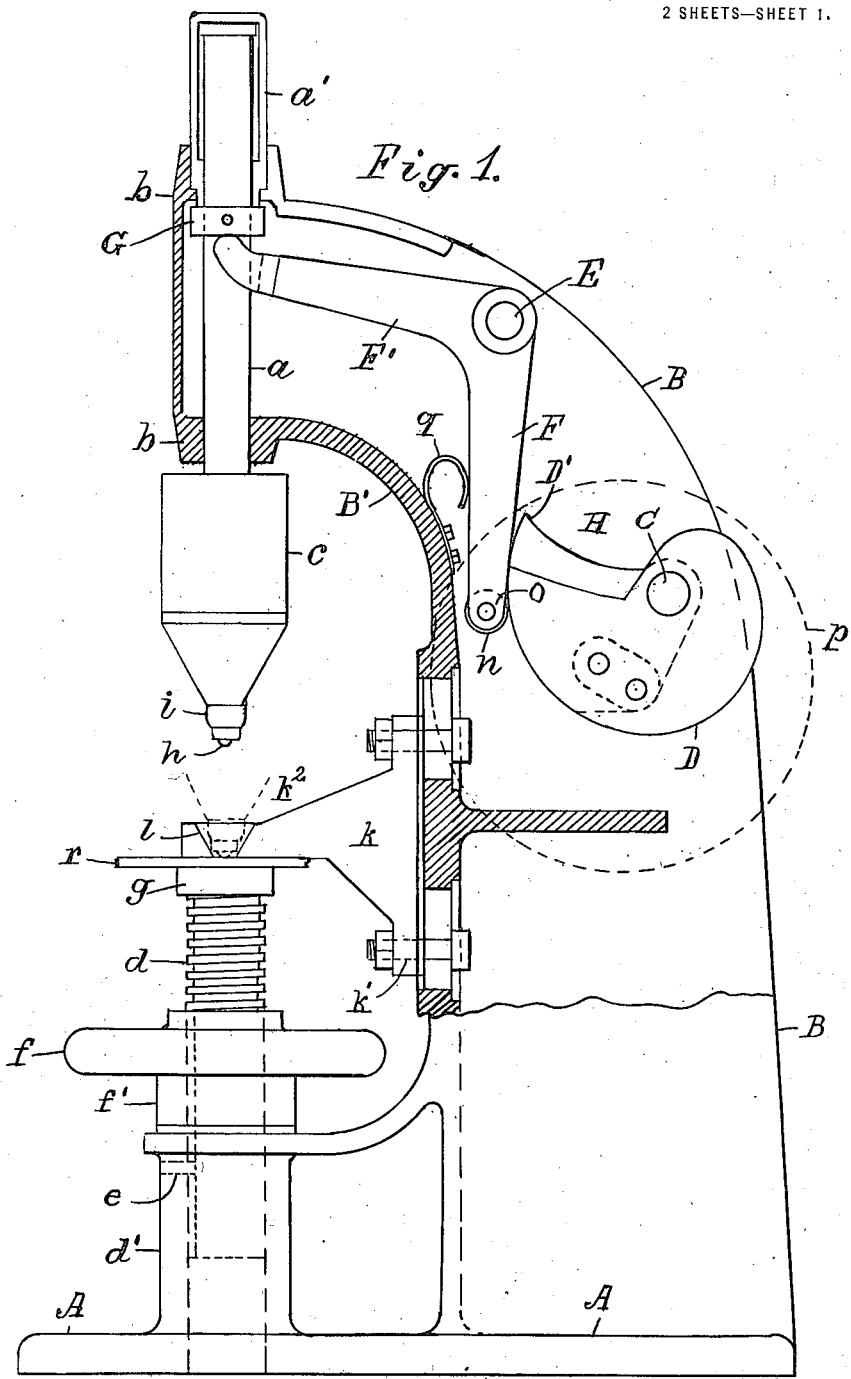

J. G. AYERS, Jr.
HARDNESS TESTING MACHINE.
APPLICATION FILED MAR. 31, 1921.

1,429,481.

Patented Sept. 19, 1922.
2 SHEETS—SHEET 1.

Inventor.
Joseph G. Ayers, Jr.,
per Thos. S. Crane, Atty.

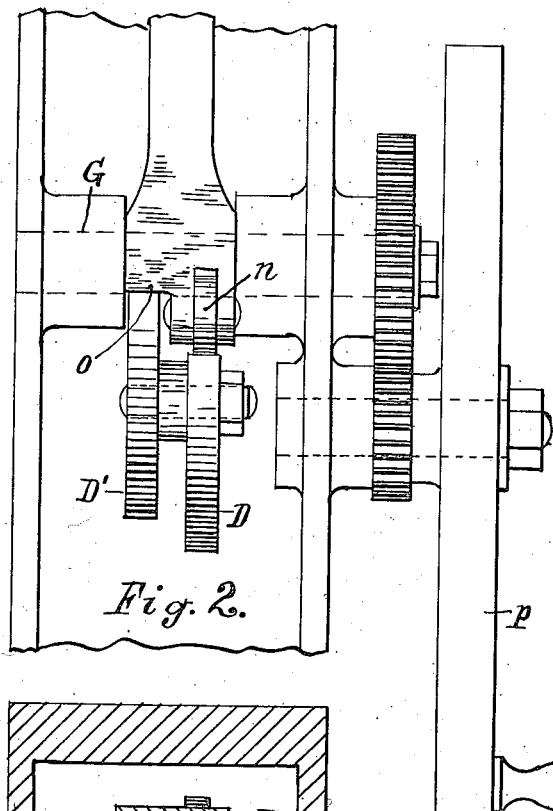
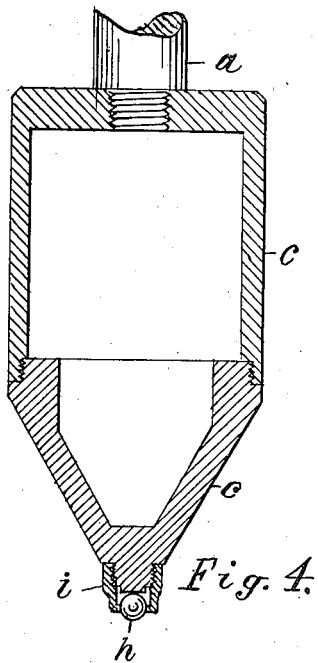
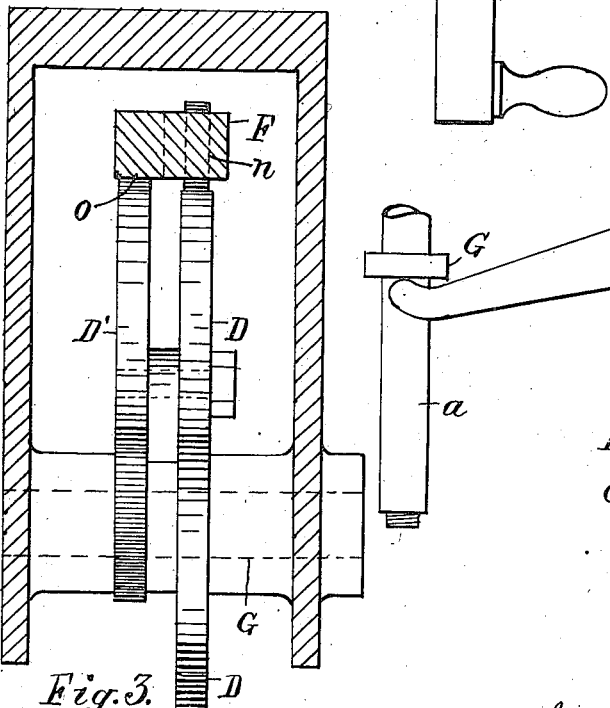
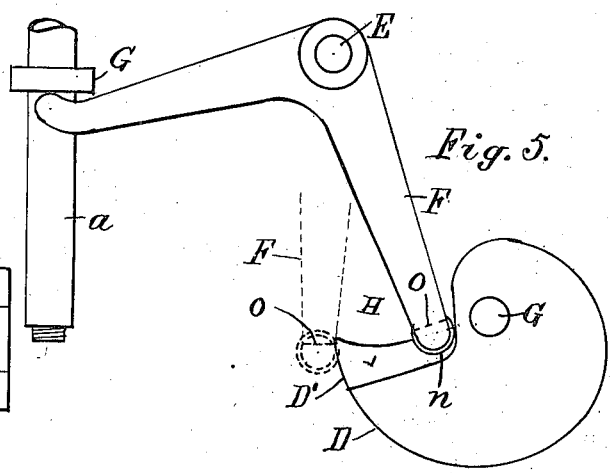

Patented Sept. 19, 1922.

1,429,481

UNITED STATES PATENT OFFICE.

JOSEPH G. AYERS, JR., OF MONTCLAIR, NEW JERSEY, ASSIGNOR TO HYATT ROLLER BEARING COMPANY, OF HARRISON, NEW JERSEY, A CORPORATION OF NEW JERSEY.

HARDNESS-TESTING MACHINE.

Application filed March 31, 1921. Serial No. 457,493.

*To all whom it may concern:*

Be it known that I, JOSEPH G. AYERS, Jr., a citizen of the United States, residing at 41 Brunswick Road, Montclair, county of Essex, and State of New Jersey, have invented certain new and useful Improvements in Hardness-Testing Machines, fully described and represented in the following specification and the accompanying drawings forming a part of the same.

The object of this invention is to test the hardness of metals by forcing a ball of given diameter into the metal under a standard impact and measuring the impression thus produced.

The so-called Brinell machine has been heretofore used in such tests, with a standard hydraulic pressure applied to the ball, and such machines are satisfactory under laboratory conditions where time is not so important a factor as accuracy. There are cases however where testing must be done on a large commercial scale, as in the acceptance of raw materials, and where the hardness variation permissible does not require tests of laboratory accuracy.

In such cases the rapid and approximate determination of the hardness of thousands of pieces is more important and satisfactory than the extremely accurate testing of a few samples.

In the present invention the tests are made by employing a standard impact instead of the dead load used in an ordinary Brinell machine, thus securing an instantaneous result.

With the Brinell mechanism several seconds are required to bring the full load to bear upon the ball and test specimen, and several more seconds are used in maintaining this pressure, according to the best practice; but the substitution of the impact for the dead load enables the specimens to be tested as rapidly as they can be inserted in and removed from the testing machine.

To hold the specimens firmly during the testing operation, a screw-support is mounted upon the base of the machine and adjustable vertically, and a clamping-arm or bracket-piece is projected from the column of the machine over such support, against which the specimens are pressed one at a time by means of the supporting screw.

A rod is movable in the frame of the machine vertically above the screw-support and carries at its lower end a standard weight to which the ball is attached by a removable holder. Such holders are made to clamp balls of different sizes to the standard weight.

It is evident that the different degrees of hardness must be expressed by some arbitrary symbol or scale which will indicate the relative hardness of different specimens.

To obtain such a relation between the various indications which may be expressed in a scale or table, necessitates the use of a constant weight descending through a uniform space and operating a ball of given diameter, and the machine therefore is intended to be adjusted for such standard operation and requires no readjustment thereafter for tests based upon such adjustment.

The use of a cam is adapted to produce a repetition of the same movement, and a cam is therefore preferably used in the present construction to actuate the weight-lifting mechanism.

A bell-crank or lever is used to lift the weight and is operated by a rotatable cam. A hand-wheel is employed, with suitable gearing, to lift the said weight by rotating the cam, which operates upon the bell-crank and is adapted to instantly release the weight when elevated to the standard height.

The invention will be understood by reference to the annexed drawing, in which Fig. 1 is a side elevation of a machine embodying the invention, with the nearer side of the supporting column broken away; Fig. 2 shows the rear side of the column and cam-connections; Fig. 3 is a plan of the cam with the elevating lever-arm *f* in section just above the roller *n*; Fig. 4 shows the test-ball with a section of its holder and the weight which carries it; and Fig. 5 is a diagram showing the release of the elevating lever from the cam.

A designates the base of the machine, and B a post projected upwardly therefrom and formed with a gooseneck B' at its upper end to project over the base.

A rod *a* is movable in bearings *b* upon the goose-neck and has the weight *c* secured to its lower end. The weight is made hollow to be loaded with granular metal to the desired amount. A cap $a'$ encloses the top of the rod $a$.

A threaded column $d$ is fitted to a socket $d'$ in the base directly beneath the rod $a$, and is held from turning in the socket by a key or pin $e$ fitted to a groove in the side of the screw. A hand-wheel $f$ has a threaded hub $f'$ fitted to turn upon the column while resting upon the top of the socket $d'$.

A bracket-piece $k$ is fitted adjustably upon the front of the post and secured rigidly in any required adjustment by clamp-bolts $k'$. This bracket-piece is formed with a clamping-arm $k^2$ which extends over the head of the screw-support, and operates as a gage to set the specimen $r$ at the lower limit of the ball's movement when the ball is pressed by the screw-support against such clamping-arm.

The head $g$ of the threaded column sustains the entire load while testing, such support being raised and lowered by turning the hand-wheel $f$ to clamp the specimens against the clamping-piece, and release them therefrom.

A test-ball $h$ is shown secured upon the bottom of the weight $c$ by a ball-holder $i$ which screws upon a nozzle on the bottom of the weight, as shown in Fig. 3.

The column is shown formed with side flanges which carry bearings for a shaft C upon which a cam D is mounted.

A bell-crank lever is journaled upon a pivot E above the cam, its lower arm F extending past the inner side of the cam. The other arm F' is forked at its end which extends beneath a collar G upon the rod $a$.

Fig. 1 shows the cam having a spiral periphery which bears upon a roller $n$ in the end of the arm F and has a notch H next to its highest point, into which the roller may drop when the bearing-surface of the cam passes the roller $n$, as shown in Fig. 5.

As the roller would not release the bell-crank instantly, I have provided a supplemental cam-face D' at one side of the cam D, and the arm F is provided with a shoulder $o$ at one side of the roller $n$ to rest upon the cam-face D' when the roller clears the highest point of the cam D.

Such shoulder and supplemental cam-face sustains the lever-arm for a moment and then permit the instantaneous release of the bell-crank which is facilitated by a spring $q$, as shown in Fig. 5. This figure shows the relation of the shoulder $o$ to the surface of the supplemental cam, the dotted line showing the shoulder $o$ resting upon the corner of the cam just before its release and the roll entirely clear from both the cam-faces D and D'. The weight C is supported wholly by the shoulder and the cam-face D'.

This construction affords an instantaneous release for the weight, which results in the exact determination of the standard height through which the ball descends.

The cam is rotated by reducing-gears $m$ and a hand-wheel $p$, and each rotation of the cam serves to lift the weight to a predetermined point and release it to descend by gravity.

The spring $q$ is applied to the bell-crank lever to retract it quickly from the collar G when the shoulder $o$ clears the cam, thus facilitating the instant descent of the weight.

The clamping-arm has a perforation $l$ in line with the ball-holder to permit the holder to press the test-ball upon the specimen. The under side of the clamping-arm thus forms the lower limit of the ball's movement, the upper limit being determined by the adjustment of the cam to the weight-lifting lever.

Fig. 1 shows the bracket-arm $h^2$ in section with the ball and ball-holder in dotted lines resting upon a specimen $r$ shown as a bit of flat metallic plate in which the ball is partially indented. The ball-holder is constructed to grip the ball a little below its greatest diameter, so as to press it against the end of the nozzle upon the weight $c'$. It is thus held in connection with the weight, while it is capable of making indentations with the greater part of its lower hemisphere.

Having thus set forth the nature of the invention what is claimed herein is:

1. An apparatus for testing the hardness of metallic specimens, consisting of the base with column projected upwardly therefrom, a threaded support mounted upon the base, a goose-neck projected over the support and provided with bearings, a rod movable through the bearings with a standard weight secured to its lower end, a test-ball secured to the lower end of the weight, means for lifting and dropping the rod and weight, and means for holding the specimens to be tested upon the threaded support.

2. An apparatus for testing the hardness of metallic specimens, consisting of the base with column projected upwardly therefrom, a threaded support mounted upon the base, a goose-neck projected over the support and provided with bearings, a rod movable through the bearings, with a standard weight secured to its lower end, a test-ball secured to the lower end of the weight, means for lifting and dropping the rod and weight, and a bracket-piece secured adjustably upon the column with clamping arm extended over the head of the threaded support to clamp the specimens thereon.

3. An apparatus for testing the hardness of metallic specimens, consisting of the base with column projected upwardly therefrom, a threaded support mounted upon the base, a goose-neck projected over the support and provided with bearings, a rod movable through the bearings with a standard weight secured to its lower end, a nozzle on the bottom of the weight with a ball-holder screwed thereon and a test-ball clamped rigidly to the weight by said holder, and means for lifting the rod and weight and dropping them upon the specimen.

4. An apparatus for testing the hardness of metallic specimens, consisting of a suitable frame, a threaded support fitted vertically adjustable in the bottom of the frame, a perforated clamping-piece held rigidly above the top of the support, means for adjusting the clamping-piece and securing it rigidly upon the column to determine the limit of movement for the test-ball, a ball-holder adapted to pass through the perforation in the clamping-piece to indent the specimen upon the screw-support, a weight attached to the ball-holder, and means for raising the weight and ball-holder to a standard height, and dropping them upon the specimens.

5. An apparatus for testing the hardness of metallic specimens, consisting of a suitable frame, a screw-support fitted vertically adjustable in the bottom of the frame, a perforated clamping-piece sustained above the top of the screw-support, a ball-holder adapted to pass through the perforation in the clamping-piece to indent the specimen upon the screw-support, a weight attached to the ball-holder, and means for raising the weight and ball-holder to a standard height and dropping them upon the specimen.

6. An apparatus for testing the hardness of metallic specimens, consisting of a rigid support vertically adjustable, a clamping-piece sustained above the said support to clamp the specimen thereto. a rod movable to and from the rigid support and having a standard weight and a standard ball attached thereto, a lever connected to the rod to lift the said weight, means for operating the lever to lift the weight, and a spring to quickly retract the lever when released, to permit the free descent of the weight.

7. An apparatus for testing the hardness of metallic specimens, consisting of a rigid support vertically adjustable, a clamping-piece sustained above the said support to clamp the specimen thereto, a rod movable to and from the rigid support and having a standard weight and a standard ball attached thereto, a lever to lift the rod and weight, a main cam with supplemental face extended beyond the corner of the cam, a roll upon the lever to rest upon the main cam, and a shoulder upon the lever to rest upon the supplemental face after the roll clears the main cam, thus dropping the weight instantly when the supplemental face clears the shoulder.

In testimony whereof I have hereunto set my hand.

JOSEPH G. AYERS, Jr.